(12) United States Patent
Schildmann et al.

(10) Patent No.: US 7,578,947 B2
(45) Date of Patent: Aug. 25, 2009

(54) METHOD FOR ETCHING NON-CONDUCTIVE SUBSTRATE SURFACES

(75) Inventors: Mark Peter Schildmann, Solingen (DE); Ulrich Prinz, Solingen (DE); Andreas Königshofen, Leverkusen (DE)

(73) Assignee: Enthone Inc., West Haven, CT (US)

( * ) Notice: Subject to any disclaimer, the term of this patent is extended or adjusted under 35 U.S.C. 154(b) by 43 days.

(21) Appl. No.: 11/554,100

(22) Filed: Oct. 30, 2006

(65) Prior Publication Data

US 2007/0099425 A1    May 3, 2007

(30) Foreign Application Priority Data

Oct. 28, 2005    (DE) .................... 10 2005 051 632

(51) Int. Cl.
*H01L 21/302* (2006.01)
(52) U.S. Cl. ....................... 216/83; 252/79.3
(58) Field of Classification Search .................. None
See application file for complete search history.

(56) References Cited

U.S. PATENT DOCUMENTS

| | | | |
|---|---|---|---|
| 3,125,474 A | | 3/1964 | Watkins et al. |
| 4,325,991 A | * | 4/1982 | Donovan et al. ............ 427/307 |
| 4,554,183 A | | 11/1985 | Sirinyan et al. |
| 4,568,571 A | | 2/1986 | Sirinyan et al. |
| 4,663,199 A | | 5/1987 | Liebler et al. |
| 6,559,242 B1 | | 5/2003 | Ball et al. |
| 6,602,394 B1 | | 8/2003 | Hillebrand |
| 6,712,948 B1 | | 3/2004 | Naruskevicius et al. |
| 6,902,765 B2 | | 6/2005 | Brandes et al. |
| 7,025,867 B2 | | 4/2006 | Czeczka et al. |
| 2004/0086646 A1 | | 5/2004 | Brandes et al. |
| 2006/0124454 A1 | | 6/2006 | Wurm et al. |

FOREIGN PATENT DOCUMENTS

| | | |
|---|---|---|
| DE | 2022109 | 11/1971 |
| DE | 2652152 A1 | 9/1977 |
| DE | 3435898 | 4/1986 |
| DE | 3719604 A1 | 12/1988 |
| DE | 19510855 A1 | 9/1996 |
| DE | 19740431 C1 | 11/1998 |
| DE | 10124631 C1 | 11/2002 |
| DE | 10261493 A1 | 7/2004 |
| EP | 0471577 A1 | 2/1992 |
| JP | 57098529 | 6/1982 |
| JP | 58225130 | 12/1983 |
| JP | 61257480 | 11/1986 |
| JP | 1150000 | 6/1989 |
| JP | 1152294 | 6/1989 |
| JP | 5320981 A | 12/1993 |
| WO | 85/05755 A1 | 12/1985 |
| WO | 8505755 A1 | 12/1985 |
| WO | 9629452 A1 | 9/1996 |
| WO | 9913696 A1 | 3/1999 |
| WO | 0029646 A1 | 5/2000 |
| WO | 2004108995 A1 | 12/2004 |

OTHER PUBLICATIONS

Dettner, et al.; Handbuch Der Galvanotechnik; Munchen 1962; pp. 769 & 1054.
Abstract of JP No. 1150000; Jun. 13, 1989.
Abstract of JP No. 1152294; Jun. 14, 1989.
Abstract of DE No. 19740431; Nov. 12, 1998.
Abstract of DE No. 19510855; Sep. 19, 1996.
Abstract of WO No. 9913696; Mar. 18, 1999.
Abstract of DE No. 3719604; Dec. 22, 1988.
Abstract of WO No. 9629452; Sep. 26, 1996.
Abstract of DE3435898; Apr. 10, 1986.
Abstract of JP57098529; Jun. 18, 1982.
Abstract of JP58225130; Dec. 27, 1983.
Abstract of JP61257480; Nov. 14, 1986.
Abstract of DE2022109; Nov. 18, 1971.
Abstract of JP5320981; Dec. 7, 1993.

* cited by examiner

*Primary Examiner*—Allan Olsen
(74) *Attorney, Agent, or Firm*—Senniger Powers LLP

(57) ABSTRACT

An etching composition for non-conductive substrates such as polyester, polyether, polyimide, polyurethane, epoxy resin, polysulfone, polyethersulfone, polyetherimide, and polyamide, comprising a halogenide and/or nitrate of a metal selected from the group consisting of Na, Mg, Al, Si, Sc, Ti, V, Cr, Mn, Fe, Co, Ni, Cu, Ca, Zn, and combinations thereof such as $FeCl_3$, $FeCl_2$, $TiCl_3$, $CaCl_2$, $CuCl_2$, $CrCl_3$, $ZnCl_2$, $MgCl_2$, $MnCl_2$, and $Cr(NO_3)_3$; and a related method for etching.

42 Claims, No Drawings

METHOD FOR ETCHING NON-CONDUCTIVE SUBSTRATE SURFACES

FIELD OF THE INVENTION

The present invention generally relates to an etching composition and a method for etching a non-conductive surface of a substrate. More specifically, the present invention relates to a method for etching a non-conductive surface of substrate to enhance its adhesive strength with a metallization layer.

BACKGROUND OF THE INVENTION

Coating non-conductive substrate surfaces, such as for example plastic surfaces, with metal coatings is a practice that is variously used for affecting the surface properties of substrates.

Metallization of non-conductive surfaces to render then electrically conductive is widely used in the field of manufacturing integrated circuits, printed circuits, or other electric or electronic components. Furthermore, surfaces are coated for decorative reasons with metal layers having corresponding optical or haptical characteristics.

Principally it is possible to deposit metal layers galvanically or autocatalytically on substrate surfaces. Before galvanic deposition, the plastic surface to be metallized is made electrically conductive by appropriate pre-treatments. Such a treatment that provides the surface with conductivity is unnecessary for the autocatalytic deposition of metal layers.

Before galvanic or autocatalytic metallization, the non-conductive surface may be roughened to improve adhesiveness of the metal layer on the substrate surface. This can be realized by a mechanical treatment or by an appropriate chemical treatment, for example with swelling agents or etchants.

For this, different methods are known from the state of the art. Thus, German patent specification DE 101 24 631 (corresponding U.S. Pat. No. 7,025,867) discloses treating a plastic surface with an acid permanganate solution prior to direct electrolytic metallization of electrically non-conductive substrate surfaces.

German patent DE 197 40 431 C1 discloses an etching step in the metallization of an electrically non-conductive surface area, in which the surface is treated in an acidic etchant containing hydrogen peroxide. Beside hydrogen peroxide, the etchant can also comprise an acid such as phosphoric acid or also organic compounds such as propan-2-ol or p-phenol-sulphonic acid.

German publication DE 195 10 855 discloses a pre-treatment of substrate surfaces with a chromic acid containing sulfuric acid etchant for a method of selective or partial electrolytic metallization of substrates on non-conductive materials. Alternatively, an alkaline permanganate solution is disclosed as etchant.

WO 99/13696 discloses a pre-treatment of surfaces to be metallized by means of a pickling or etching composition comprising hydrogen peroxide for a metallization method of a substrate comprising electrically non-conductive surface areas. The disclosed etching compositions can furthermore contain phosphoric acid, methane sulfonic acid or ethanoic acid, wherein the hydrogen ionic concentration is limited to about 0.5 mol/kg solution.

German patent application DE 100 54 544 (corresponding U.S. Pat. No. 6,902,765) also discloses a pre-treating etching method of substrate surfaces by means of a solution containing chromate ions for a method of chemical metallization of surfaces, in particular surfaces of acrylonitrile/butadiene/styrene copolymers (ABS copolymers) and of a mixture of these copolymers. The solutions comprise chromium trioxide and concentrated sulphuric acid.

In all etching methods, it is important to solubilize the substrate surface in order to form the required adhesive surface for the metal layer to be deposited.

Substrates to be coated can be for example plastics, such as polyester, polyether, polyimides, polyurethanes, polyamides, epoxy resins, polysulfones, polyethersulfones, polyetherimides etc.

However, in particular for substrates based on polyamide, the methods known from the state of the art for preparing surfaces, such as the etching with chromic-sulfuric acid mixture, alkaline solutions, or acids, can cause problems since these pre-treatment methods lead to irreversible deterioration of the polyamide surface.

An approach for solving these problems is the surface etching method disclosed in the magazine *metalloberfläche* volume 59 (2005) no. 4 on pages 55 and following, which uses a reduced chromium trioxide concentration. Hitherto, about 400 g/L chromium trioxide have been used in the state of the art, but the here disclosed method uses a composition comprising about 80 g/L chromium trioxide.

But the use of chromium trioxide is difficult because of the environmental problems caused by chromates.

SUMMARY OF THE INVENTION

Briefly, therefore, the invention is directed to a method for etching a non-conductive surface by contacting it with an etching composition comprising a compound selected from the group consisting of halogenides and nitrate salts of a metal selected from the group consisting of Na, Mg, Al, Si, Sc, Ti, V, Cr, Mn, Fe, Co, Ni, Cu, Ca, Zn, and combinations thereof.

In another aspect, the invention is directed to an etching composition for preparing a plastic surface to be metallized, wherein the etching composition comprises a halogenide and/or nitrate salt of a metal selected from the group consisting of Na, Mg, Al, Si, Sc, Ti, Ca, V, Cr, Mn, Fe, Co, Ni, Cu, Zn, and combinations thereof.

The invention is also directed to a method for the metallization of a plastic surface comprising etching the surface by contacting it with an etching composition comprising a compound selected from the group consisting of halogenides and nitrate salts of a metal selected from the group consisting of Na, Mg, Al, Si, Sc, Ti, V, Cr, Mn, Fe, Co, Ni, Cu, Ca, Zn, and combinations thereof; contacting the etched surface with an activator solution selected from the group consisting of precious metal colloid activator solutions and ionogenic precious metal activator solutions; contacting the activated surface with an accelerator solution; and contacting the treated surface with an autocatalytic metallization bath or a direct metallization bath.

Other objects and features will be in part apparent and in part pointed out hereinafter.

DESCRIPTION OF THE PREFERRED EMBODIMENTS

This application claims priority from German application 10 2005 051 632.7, the entire disclosure of which is incorporated by reference.

The present invention is directed to an etching composition and a method employing the etching composition for etching a non-conductive substrate surface. The etching method is used to enhance the surface's adhesive strength, and the method is able to overcome the disadvantages known from the state of the art and generates a sufficient surface roughness without using any chromates. The method is particularly suitable for etching a substrate comprising a polyamide surface.

This object is achieved by a method for etching a plastic surface before metallization that is characterized in that the surface to be etched contacted with an etching composition comprising a halogenide and/or nitrate salt of a metal selected from the group consisting of Na, Mg, Al, Si, Sc, Ti, V, Cr, Mn, Fe, Co, Ni, Cu, Ca, Zn, and combinations thereof. In a preferred embodiment, the etching composition comprises a halogenide and/or nitrate salt of a metal selected from the group consisting of Fe, Cu, Ti, Cr, Zn, Mg, Mn, and combinations thereof. In a particularly preferred embodiment, the etching composition comprises a halogenide and/or nitrate salt of a metal selected from the group consisting of Fe, Cu, and a combination thereof. Certain of these metals may be present in the composition in more than one oxidation state. For the purposes of this invention, the etching composition may comprise metal ions in any of the oxidation states. For example, the etching composition may comprise a source of iron ions comprising $Fe^{2+}$, $Fe^{3+}$, or even a combination thereof. The halogen component of the halogenide assists with solubility, and the cation component provides etching function.

In one embodiment, the etching composition comprises a halogenide. The halogenide may be any of chloride, bromide, iodide, and fluoride. In one preferred embodiment, the halogenide is chloride. The halogenide is added to increase solubility of the components and to impart acidity. Suitable chloride salts may be selected from the group consisting of $FeCl_3$, $FeCl_2$, $TiCl_3$, $CuCl_2$, $CrCl_3$, $ZnCl_2$, $MgCl_2$, $CaCl_2$, $MnCl_2$, and combinations thereof. Use of these salts with $Cr(NO_3)_3$ has proven to be especially suitable.

In one embodiment, the etching composition may comprise a soluble fluoride. Herein, coordinative fluoride compounds of the general formula $M^1(HF_2)$ have proven to be especially suitable. In the general formula $M^1(HF_2)$, $M^1$ represents a counter-cation having a single positive charge. $M^1$ may include alkali metal cations such as sodium and potassium. $M^1$ may also include amines having a single positive charge. Herein, $M^1$ can be, for example, a $NH_4^+$ group. Other soluble fluoride salts are equally suitable.

According to the method of the present invention, an etching composition is used that comprises the halogenide and/or nitrate salt of a metal selected from the group consisting of Na, Mg, Al, Si, Sc, Ti, V, Cr, Ca, Mn, Fe, Co, Ni, Cu, Zn, and combinations thereof in a concentration between at least 0.1 M and the solubility limit. In the method according to the invention an etching composition is preferably used which contains the metal salt in a concentration between about 0.5 M and about 10 M, preferably between about 2 M and about 4 M.

The etching composition used in the method according to the invention may comprise the soluble fluoride in a concentration between about 0.05 M and about 10 M, preferably between about 0.25 M and about 3.6 M, and more preferably between 0.3 M and about 1.8 M.

Furthermore, the etching composition used in the method according to the invention may further comprise an acid. Herein, both organic and inorganic acids having a $pK_S$ value of less than or about 5.0 can be used. Exemplary acids for this purpose include acetic acid, nitric acid, hydrochloric acid, hydrofluoric acid, and others. Since the etching composition comprises a halogenide and/or nitrate salt of a metal, the acid may preferably have the same anion as the metal salt to avoid introducing extraneous anions into the etching composition.

The etching composition may comprise the acid in a concentration between about 0.01 M and about 10 M, preferably between about 0.1 M and about 5 M, and more preferably between about 0.5 M and about 3.0 M. At these concentrations, the etching composition has a pH typically less than about 5.0, more typically less than about 3.0. Preferably, the etching composition pH is less than about 2.0.

To improve surface wetting, the etching composition used in the method according to the invention may comprise a wetting agent. Herein, wetting agents that are stable, i.e., do not hydrolyze, in the acidic medium have proven to be advantageous. Applicable wetting agents include alkylglucosides, polyalkyletherglycols, and alkylsulfates. The etching composition may contain wetting agents in a concentration between about 0.0001 M and about 1.0 M, preferably between about 0.001 M and about 0.5 M, and more preferably between about 0.01 M and about 0.1 M.

Small quantities of precious metals or precious metal compounds may be added to the etching composition used in the method according to the invention. It is, for example, possible to add 75 ppm $Pd^{2+}$ to the etching composition for an improved absorption of palladium colloids.

The etching composition may comprise supplemental solvents, most typically low molecular weight alcohols, ketones, and ethers. Alcohols have a tendency to cause swelling in certain substrates such as ABS substrates; so in a preferred embodiment, the etching composition is alcohol-free in the sense that it contains no alcohol or alcohol only in such low trace amounts as to not cause swelling in ABS substrates. Preferably, water is the only solvent.

According to the method of the present invention, the plastic surface to be etched is contacted with the etching composition for a period between about 0.1 minutes and about 20 minutes, preferably between about 1.0 minutes and about 10 minutes. Herein, the etching composition temperature can be in a range between about 15° C. and about 65° C., preferably between about 25° C. and about 35° C.

The etching composition and the etching method according to the invention provide a method for the metallization of substrate surfaces which is characterized by the process steps:

Etching the surface of the substrate with an etching composition according to the present invention comprising a halogenide and/or a nitrate salt. Applicable substrates include non-conductive plastic substrates, such as ABS, ABS/PC blends, and pure polycarbonate substrates. Additionally, polyamide substrates, such as Nylon 6 and Nylon 6,6, may be metallized using the method of the present invention.

Contacting the etched surface with an activator solution containing a precious metal colloid or with an ionogenic precious metal activator solution. The components of a typical activator solution include a source of noble metal ions such as Pd ions. An exemplary activator solution is available from Enthone Inc. of West Haven, Conn. under the trade name Udique 879W.

Contacting the activated surface with an accelerator solution. An exemplary accelerator solution is available from Enthone Inc. of West Haven, Conn. under the trade name Enplate Accelerator 860.

Metallization of the treated surface in an autocatalytic metallization bath or a direct electrolytic metallization bath. An exemplary metallization solution for Ni is available from Enthone Inc. of West Haven, Conn. under the trade name Udique NI 891.

The metal layers that have thus been deposited on the substrates are connected to the surface in a firmly adhering manner. This is in particular due to the advantageous etching treatment according to the etching method according to the invention with the etching composition according to the invention.

The following examples further illustrate an etching method according to the invention as well as an etching composition according to the invention without however limiting the invention to the exemplary embodiments.

Example 1

Etching Composition

An etching composition according to the present invention was prepared comprising the following components and concentrations:
FeCl$_3$ (500 g/L)
HCl (50 mL/L, concentrated)
NH$_4$HF$_2$ (10 g/L)
Wetting agent (5 mL/L, octylglycoside)

The etching composition was prepared by dissolving the components above in the following order: FeCl$_3$, HCl, NH$_4$HF$_2$, and Wetting agent.

Example 2

Etching Method

A polyamide injection molded part made of polyamide (Nylon 6) was contacted with the etching composition described in Example 1 at 50° C. for 4 minutes. The injection molded part to be metallized was rinsed before a subsequent autocatalytic metallization.

Example 3

Complete Electroless Nickel Metallization Process

A polyamide injection molded part prepared according to the method described in Example 2 was treated as follows:

Contacting part for 4 minutes in FeCl$_3$ etching composition of Example 1 at 50° C.
Rinsing.
Treating with an activator solution at 26° C. for 2 minutes. An exemplary activator solution is sold under the trade name Udique 879W by Enthone Inc.
Rinsing.
Contacting the substrate with an accelerator solution at room temperature for 2 minutes. An exemplary accelerator solution is sold under the trade name Enplate Accelerator 860 by Enthone Inc.
Rinsing.
Electroless nickel-plating of the treated plastic surface at a pH value of 9.0 at 30° C. for 10 minutes. An exemplary nickel-plating chemistry is sold under the trade name Udique NI 891 by Enthone Inc.
Rinsing.
Further formation of metal layers, if desired.

The etching method according to the invention is advantageously compatible with many existing lines for the metallization of ABS plastics. It leads to a more uniform roughening and germination of the plastic surface and thus to a faster metallization with less defects, for example in the autocatalytic nickel-plating. The obtained results can be very well reproduced and no familiarization with the metallization process on laboratory scale is required. Furthermore, there is no need to adapt the stabilizer content in the metallization following the etching step.

Example 4

Etching Composition

An etching composition according to the present invention was prepared comprising the following components and concentrations:
CaCl$_2$ (225 g/L)
HCl (50 mL/L, concentrated)
NH$_4$HF$_2$ (10 g/L)
Wetting agent (5 mL/L, octylglycoside)

The etching composition was prepared by dissolving the components above in the following order: CaCl$_2$, HCl, NH$_4$HF$_2$, and Wetting agent.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. Accordingly, where the invention is described as comprising a compound selected from the group consisting of halogenides and nitrate salts of a metal selected from the group consisting of Na, Mg, Al, Si, Sc, Ti, V, Cr, Mn, Fe, Co, Ni, Cu, Ca, Zn, and combinations thereof, embodiments are encompassed which include one such compound such as FeCl$_3$, as well as embodiments which include more than one such compound, such as FeCl$_2$, TiCl$_3$, and FeCl$_3$.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

What is claimed is:

1. A method for etching a non-conductive surface of a substrate, the method comprising:
contacting the non-conductive surface with an etching composition comprising a compound selected from the group consisting of halogenides and nitrate salts of a metal selected from the group consisting of Fe, Cu, Ti, Cr, Zn, Mg, Mn, and combinations thereof, and a coordinative fluoride having the general formula M$^1$(HF$_2$) wherein M$^1$ is a counter-cation having a single positive charge.

2. The method of claim 1 wherein the plastic surface is a polyamide surface or an ABS surface.

3. The method of claim 1 wherein said compound is selected from the group consisting of halogenides and nitrate salts of a metal selected from the group consisting of Fe and Cu.

4. The method of claim 1 wherein said compound is a ferric chloride.

5. The method of claim 1 wherein said compound is present in a concentration between about 0.5 M and about 10 M.

6. The method of claim 1 wherein said compound is present in a concentration between about 2 M and about 4 M.

7. The method of claim 1 wherein the etching composition further comprises a wetting agent in a concentration between about 0.001 M and about 0.5 M.

8. The method of claim 1 wherein the substrate is a plastic selected from the group consisting of polyester, polyether, polyimide, polyurethane, epoxy resin, polysulfone, polyethersulfone, polyetherimide, and polyamide.

9. The method of claim 1 wherein the etching composition is alcohol-free.

10. The method of claim 1 wherein the etching composition further comprises an acid.

11. The method of claim 10 wherein the acid has a $pK_S$ value of less than or equal to about 5.0.

12. The method of claim 10 wherein the acid is present in a concentration between about 0.1 M and about 5 M.

13. The method of claim 10 wherein the acid is present in a concentration between about 0.5 M and about 3.0 M.

14. A method for the metallization of a plastic surface which is a polyamide surface or an ABS surface, the method comprising:
   etching the surface by contacting the non-conductive surface with an etching composition comprising a compound selected from the group consisting of halogenides and nitrate salts of a metal selected from the group consisting of Na, Mg, Al, Si, Sc, Ti, V, Cr, Mn, Fe, Co, Ni, Cu, Ca, Zn, and combinations thereof;
   contacting the etched surface with an activator solution selected from the group consisting of precious metal colloid activator solutions and ionogenic precious metal activator solutions to yield an activated surface;
   contacting the activated surface with an accelerator solution; and
   metallizing the surface by autocatalytic metallization bath or direct electrolytic metallization to yield a metallized plastic surface.

15. The method of claim 14 wherein said compound is selected from the group consisting of $FeCl_3$, $FeCl_2$, $TiCl_3$, $CaCl_2$, $CuCl_2$, $CrCl_3$, $ZnCl_2$, $MgCl_2$, $MnCl_2$, and $Cr(NO_3)_3$.

16. The method of claim 14 wherein said compound is selected from the group consisting of halogenides and nitrate salts of a metal selected from the group consisting of Fe, Cu, Ti, Cr, Zn, Mg, Mn, and combinations thereof.

17. The method of claim 14 wherein said compound is a ferric chloride.

18. The method of claim 14 wherein said compound is present in a concentration between about 0.5 M and about 10 M.

19. The method of claim 14 wherein the substrate is a plastic selected from the group consisting of polyester, polyether, polyimide, polyurethane, epoxy resin, polysulfone, polyethersulfone, polyetherimide, and polyamide.

20. The method of claim 14 wherein the etching composition further comprises a soluble fluoride in addition to said compound.

21. The method of claim 20 wherein the soluble fluoride is present in a concentration between about 0.15 M and about 3.6 M.

22. The method of claim 20 wherein the soluble fluoride is present in a concentration between about 0.3 M and about 1.8 M.

23. The method of claim 20 wherein the soluble fluoride is a coordination compound having the general formula $M^1(HF_2)$ wherein $M^1$ is a counter-cation having a single positive charge.

24. The method of claim 23 wherein $M^1$ is a $NH_4$ group.

25. A method for etching a non-conductive surface of a substrate, the method comprising:
   contacting the non-conductive surface with an alcohol-free etching composition having a pH less than about 3 and comprising:
   a compound selected from the group consisting of halogenides and nitrate salts of a metal selected from the group consisting of Fe, Cu, Ti, Cr, Zn, Mg, Mn, and combinations thereof,
   a coordinative fluoride having the general formula $M^1(HF_2)$ wherein $M^1$ is a counter-cation having a single positive charge,
   a wetting agent, and
   an acid.

26. The method of claim 25 wherein said compound is selected from the group consisting of halogenides and nitrate salts of a metal selected from the group consisting of Fe and Cu.

27. The method of claim 25 wherein said compound is a ferric chloride.

28. The method of claim 25 wherein said compound is present in a concentration between about 0.5 M and about 10 M.

29. The method of claim 25 wherein said compound is present in a concentration between about 2 M and about 4 M.

30. The method of claim 25 wherein the coordinative fluoride is present in a concentration between about 0.15 M and about 3.6 M.

31. The method of claim 25 wherein the coordinative fluoride is present in a concentration between about 0.3 M and about 1.8 M.

32. The method of claim 25 wherein the acid has a $pK_S$ value of less than or equal to about 5.0, and a concentration between about 0.5 M and about 3.0 M.

33. The method of claim 25 wherein the substrate is a plastic selected from the group consisting of polyester, polyether, polyimide, polyurethane, epoxy resin, polysulfone, polyethersulfone, polyetherimide, and polyamide.

34. A method for etching a non-conductive surface of a substrate, the method comprising:
   contacting the non-conductive surface with an alcohol-free etching composition having a pH less than about 3 and comprising:
   a compound selected from the group consisting of halogenides and nitrate salts of a metal selected from the group consisting of $FeCl_3$, $FeCl_2$, $TiCl_3$, $CaCl_2$, $CuCl_2$, $CrCl_3$, $ZnCl_2$, $MgCl_2$, $MnCl_2$, and $Cr(NO_3)_3$; and
   a coordinative fluoride having the general formula $M^1(HF_2)$ wherein $M^1$ is a counter-cation having a single positive charge,
   a wetting agent, and
   an acid.

35. The method of claim 34 wherein said compound is selected from the group consisting of halogenides and nitrate salts of a metal selected from the group consisting of Fe and Cu.

36. The method of claim 34 wherein said compound is a ferric chloride.

37. The method of claim 34 wherein said compound is present in a concentration between about 0.5 M and about 10 M.

38. The method of claim 34 wherein said compound is present in a concentration between about 2 M and about 4 M.

39. The method of claim 34 wherein the coordinative fluoride is present in a concentration between about 0.15 M and about 3.6 M.

40. The method of claim 34 wherein the coordinative fluoride is present in a concentration between about 0.3 M and about 1.8 M.

41. The method of claim 34 wherein the acid has a $pK_S$ value of less than or equal to about 5.0, and a concentration between about 0.1 M and about 5 M.

42. The method of claim 34 wherein the substrate is a plastic selected from the group consisting of polyester, polyether, polyimide, polyurethane, epoxy resin, polysulfone, polyethersulfone, polyetherimide, and polyamide.

* * * * *